(12) United States Patent
Gopinathan et al.

(10) Patent No.: US 6,433,965 B1
(45) Date of Patent: Aug. 13, 2002

(54) LAMINATED CARBON-CONTAINING OVERCOATS FOR INFORMATION STORAGE SYSTEM TRANSDUCERS

(75) Inventors: Niranjan Gopinathan, San Jose; Francis W. Ryan, Martinez; Eric T. Sladek; James A. Tiernan, both of Pleasanton; Michael A. Stacy, Palo Alto, all of CA (US); Dulyarat Mokararat, Pathumthani (TH)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/517,217

(22) Filed: Mar. 2, 2000

(51) Int. Cl.7 .................................................. G11B 5/60
(52) U.S. Cl. ..................................................... 360/235.4
(58) Field of Search ................................ 360/234–240, 360/246.2

(56) References Cited

U.S. PATENT DOCUMENTS

| | | | |
|---|---|---|---|
| 4,130,847 A | 12/1978 | Head et al. | 360/122 |
| 5,023,738 A | 6/1991 | Prenosil | 360/122 |
| 5,159,508 A | 10/1992 | Grill et al. | 360/103 |
| 5,271,802 A * | 12/1993 | Chang | 360/235.4 |
| 5,751,521 A | 5/1998 | Gill | 360/113 |
| 5,781,377 A | 7/1998 | Koka et al. | 360/103 |
| 5,805,380 A | 9/1998 | Ishihara et al. | 360/103 |
| 5,858,182 A | 1/1999 | Horng et al. | 204/192.16 |
| 5,864,452 A | 1/1999 | Hirano et al. | 360/122 |
| 5,903,969 A | 5/1999 | Haga | 29/603.18 |
| 5,943,187 A | 8/1999 | Chen et al. | 360/103 |
| 5,986,851 A | 11/1999 | Angelo et al. | 360/103 |
| 6,084,743 A | 7/2000 | Comstock et al. | 360/97.02 |
| 6,198,600 B1 | 3/2001 | Kitao et al. | 360/235.2 |
| 6,246,538 B1 * | 6/2001 | Kasamatsu | 360/236.3 |
| 6,249,403 B1 | 6/2001 | Tokisue et al. | 360/235.2 |

* cited by examiner

*Primary Examiner*—A. J. Heinz
(74) *Attorney, Agent, or Firm*—Mark Lauer

(57) ABSTRACT

Plural carbon-containing overcoats are formed on a media-facing surface of an information storage system head. The plural carbon-containing overcoats can mitigate corrosion without increasing head-media spacing. A first of the overcoats may be formed prior to creation of contact or air bearing features on the media-facing surface, with a second overcoat formed after creation of air bearing features. The first overcoat may be etched back substantially or completely prior to formation of the second overcoat. Laminated carbon-containing overcoats may have greater strength and/or coverage than non-laminated overcoats of the same thickness. The overcoats may be formed of several forms of diamond-like carbon (DLC) or silicon-carbide (SiC).

20 Claims, 6 Drawing Sheets

LAMINATED CARBON-CONTAINING OVERCOATS FOR INFORMATION STORAGE SYSTEM TRANSDUCERS

BACKGROUND OF THE INVENTION

The present invention relates to information storage system transducers. It is well known in the field of magnetic information storage systems that a means for increasing storage density and signal resolution is to reduce the separation between a transducer and associated media. For many years, devices incorporating flexible media, such as floppy disk or tape drives, have employed a head in contact with the flexible media during operation in order to reduce the head-media spacing. Recently, hard disk drives have been designed which can operate with high-speed contact between the hard disk surface and the head.

Another means for increasing signal resolution that has become increasingly icommon is the use of magneto resistive (MR) or other sensors for a head. MR elements may be used along with inductive writing elements, or may be separately employed as sensors. While MR sensors offer greater sensitivity than inductive transducers, they are more prone to damage from high-speed contact with a hard disk surface, and may also suffer from corrosion. For these reasons, air bearing surfaces (ABS) for heads containing MR sensors are conventionally coated with a hard, durable carbon or carbon-based overcoat. During etching of the ABS that creates relieved features for interacting with the rapidly moving media surface, the MR sensors are covered with a mask.

The overcoats may be formed before or after etching of the ABS. Current methods for making ABS overcoats include sputtering or ion beam chemical vapor deposition (IBCVD) to form diamond-like carbon (DLC) films. More recently, cathodic arc deposition has been used to form tetrahedral-amorphous carbon (ta-C) films having even greater hardness. Employment of harder films allows the thickness of the films to be reduced, which can help to reduce head-media spacing.

DLC and ta-C films have a high stress as well as high hardness, and do not adhere well to slider ABS or magnetic layers, and so an adhesion layer of Si or $Si_3N_4$ is conventionally formed to help with stress relief and adhesion. The DLC coating 20 conventionally has a thickness that is about four times that of the adhesion layer. Thus a 80 Å layer of DLC may be formed on a 20 Å adhesion layer of $Si_3N_4$, to create a minimum head-media spacing of 100 Å. Further head-media spacing conventionally occurs due to penetration of energetic interlayer ions into underlying magnetic layers, deadening a portion of those magnetic layers.

It is not clear that the minimum head-medium spacing due to these layers can be reduced substantially without encountering problems in overcoat durability and adhesion layer continuity. For example, a 10 Å adhesion layer may be only a few atoms thick, and may not provide adequate adhesion even if one assumes that the somewhat thicker carbon overcoat can withstand high-speed head-disk contact without damage or removal. Further, the possibility of corrosion may increase as conventional overcoats are made thinner, risking failure of the head.

SUMMARY OF THE INVENTION

In accordance with the present invention plural carbon-containing overcoats are formed on a media-facing surface of a head. The plural carbon-containing overcoats may serve to avoid corrosion without increasing head-media spacing. A first of the overcoats may be formed prior to creation of air bearing features on the media-facing surface, with a second overcoat formed after creation of air bearing features. The first overcoat may be etched back substantially or completely prior to formation of the second overcoat. The overcoats may be formed of several forms of diamond-like carbon (DLC) or silicon-carbide (SiC).

DESCRIPTION OF THE PREFERRED EMBODIMENT

Figure 1:
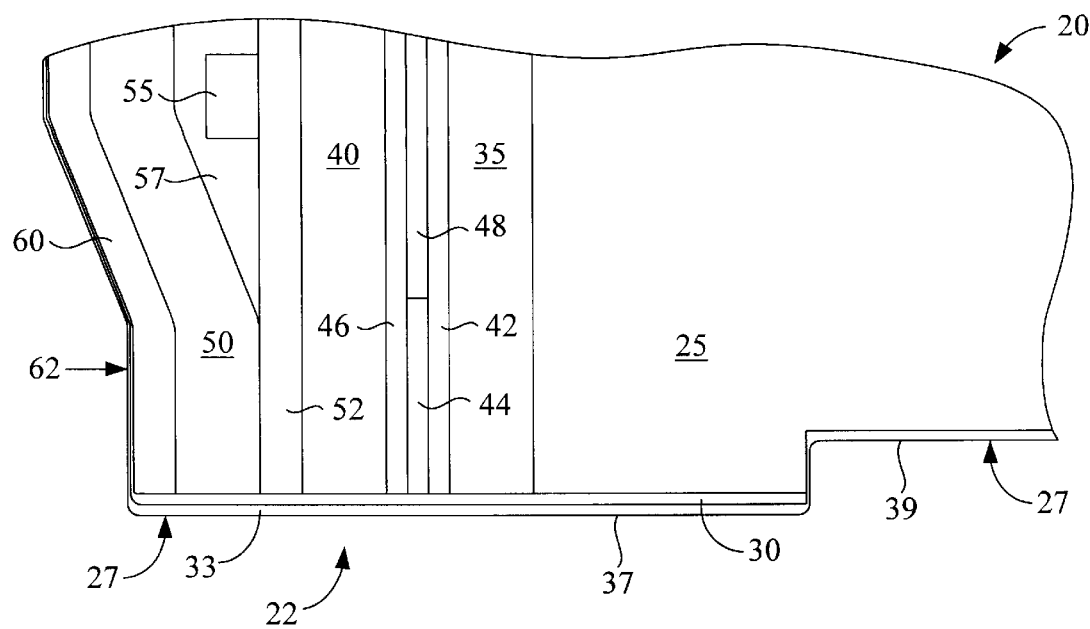
FIG. 1 is a cutaway cross-sectional view of a head formed in accordance with the present invention having dual carbon-based overcoats.

FIG. 1 is a cutaway cross-sectional view of a head 20 formed in accordance with the present invention. As discussed in detail below, the head 20 includes a transducer 22 that has been formed on a wafer substrate 25 along with thousands of other transducers, which are diced into rows and further processed to create a media-facing surface 27, including forming plural carbon-containing overcoats 30 and 33. The media-facing surface is relieved for interaction with a media such as a disk, with a projection 37 containing the transducer 22 and a recess 39 adjacent the projection. The recess 39 is formed by etching after formation of the first overcoat 30, during which the projection 37 is covered with a mask, so that the first overcoat does not cover the recess. The second overcoat 33, on the other hand, is formed after the etching that creates the recess 39, and so the second overcoat is disposed on the recess as well as the projection 37. This has an advantage of providing a carbon-containing overcoat that covers the entire media-facing surface, but which is thickest on media-facing surface projections that are most likely to contact the media and, in the absence of the overcoat, be damaged by that contact. Independent control of the coating thickness on the projection relative to the coating thickness on the recess allows those thicknesses to be independently optimized.

The transducer 22 in this embodiment includes a magnetically permeable shield layer 35 and a magnetically permeable first pole layer 40, which are sandwiched about a MR sensor 44. First and second non-ferromagnetic, electrically insulating read gap layers 42 and 46 separate the sensor 44 from the shield layer 35 and first pole layer 40, respectively, and a back gap layer 48 abuts the sensor distal to the media-facing surface 27. A magnetically permeable second pole layer 50 is separated from the first pole layer 40 by a write gap 52 formed of non-ferromagnetic, electrically insulating material. Also disposed between the first and second poles 40 and 50 is an electrically conductive coil 55 and an electrically insulating spacer material 57. A protective layer 60 coats a trailing end 62 of the head 20, which may also be thinly covered with overcoats 30 and 33.

Figure 2:
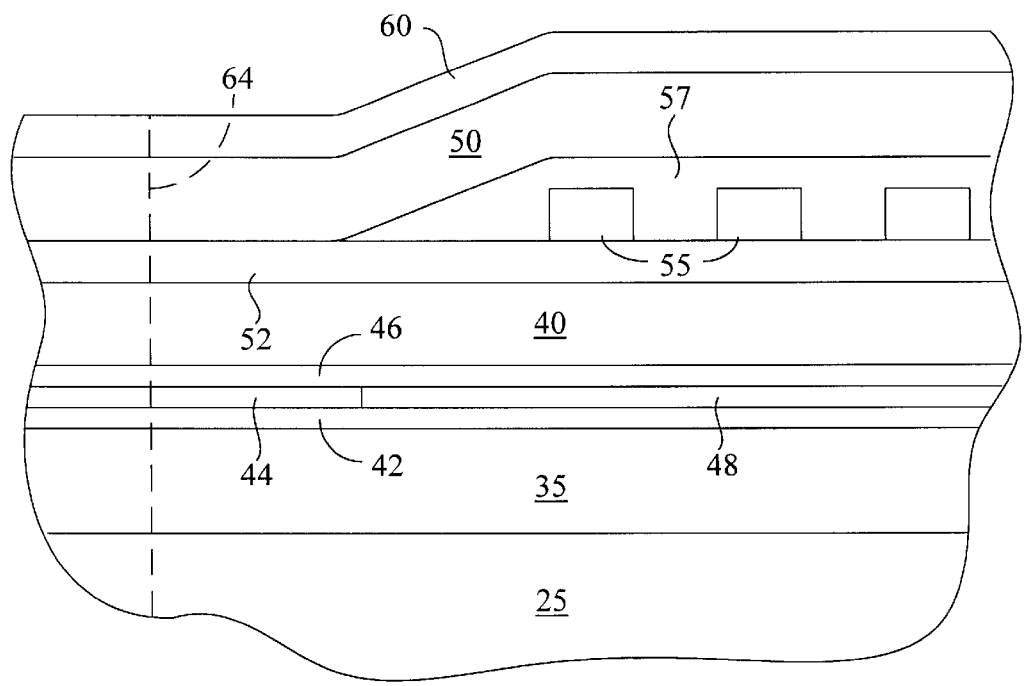
FIG. 2 is a cutaway cross-sectional view of a stage in the formation of the head of FIG. 1.

FIG. 2 shows some initial, wafer-level steps in forming the head of FIG. 1. On the wafer substrate 25, which may be made of AlTiC, SiC or other known materials and which has been polished and cleaned, the first magnetically permeable shield layer 35 is formed, for instance of permalloy ($Ni_{80}Fe_{20}$). An optional surface layer, not shown, may be formed on the wafer prior to forming the shield layer to provide a smooth, defect-free surface. The first read gap layer 42 of nonmagnetic, electrically insulating material such as alumina or DLC is then formed, on top of which a magnetoresistive (MR) sensor 44 is formed. The MR sensor 44 may be an anisotropic magnetoresistive (AMR) sensor, canted current sensor, spin valve (SV) sensor, giant magnetoresistive (GMR) sensor, or other known sensor. After the MR sensor 44 has been defined, the back gap 48 and second read gap 46 of nonmagnetic material such as alumina are formed, optionally at the same time. The first pole layer 40 of magnetically permeable material such as permalloy that also serves as a shield for the sensor 44 is then formed. The nonmagnetic, electrically insulating write gap 52 of material such as alumina is formed on the first pole layer 40, and the conductive coil 55 is formed on the write gap 52, the coil surrounded by nonmagnetic, electrically insulating material 57 such as baked photoresist. The second pole layer 50 of magnetically permeable material is then formed, and the protective coating 60 of alumina, DLC or other materials is conventionally formed. The substrate and thin film layers are then diced along line 64 and other lines, as discussed below with regard to FIG. 4, forming perhaps thousands of heads from a single wafer.

Figure 3A:
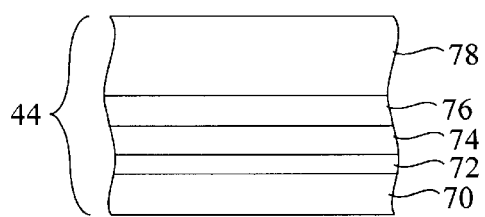
FIG. 3A is a cutaway cross-sectional view of plural layers forming a spin-valve sensor for the head of FIG. 1.

FIG. 3A provides greater detail for an embodiment in which the MR sensor 44 is a spin valve (SV) sensor. For this embodiment, a ferromagnetic free layer may be formed by depositing for instance a CoFe layer 70 and then a NiFe layer 72. A thin conductive spacer layer 74 is then formed, for example of Cu. A ferromagnetic layer 76 is then formed of a material such as CoFe, having a magnetic moment pinned by an antiferromagnetic layer 78. The layers 70, 72, 74 and 76 may each have a thickness in a range between a few angstroms and one hundred angstroms, whereas the antiferromagnetic layer 78, which may be made of PtMn for example, may be thicker.

Figure 3B:
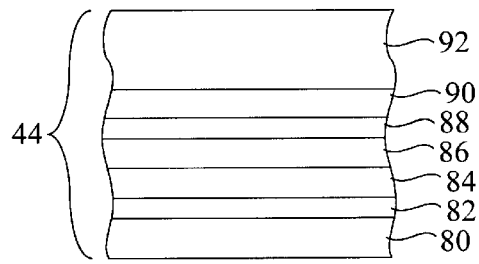
FIG. 3B is a cutaway cross-sectional view of plural layers forming a top synthetic spin-valve sensor for the head of FIG. 1.

FIG. 3B depicts an embodiment in which the MR sensor 44 is a top synthetic spin valve (TSSV) sensor. Much as before, a ferromagnetic free layer may be formed by depositing for instance a CoFe layer 80 and then a NiFe layer 82. A thin conductive spacer layer 84 is then formed, for example of Cu. A first coupled ferromagnetic layer 86 is then formed, followed by a thin layer 88 of a platinum group element such as ruthenium (Ru), iridium (Ir) or rhodium (Rh). Layer 88 may for example be made Ru that is less than 10 Å-thick, which is then covered with a second coupled ferromagnetic layer 90 having a thickness substantially matching that of first coupled layer 86, such that the ferromagnetic layers 86 and 90 are magnetostatically coupled about the platinum group layer 88. An antiferromagnetic layer 92, which may be made of PtMn for example, is formed on and pins ferromagnetic layer 90, also pinning coupled layer 86.

Figure 3C:
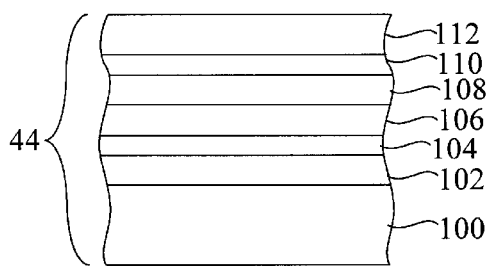
FIG. 3C is a cutaway cross-sectional view of plural layers forming a bottom synthetic spin-valve sensor for the head of FIG. 1.

FIG. 3C illustrates an embodiment in which the MR sensor 44 is a bottom synthetic spin valve (BSSV) sensor. In this case, an antiferromagnetic layer 100, which may be made of PtMn for example, is first formed. First and second ferromagnetic layers 102 and 106, which may contain CoFe, are magnetically coupled about noble metal layer 104, which may contain Ru. Antiferromagnetic layer 100 pins the coupled layers 102 and 106. A conductive spacer layer 108, which may contain Cu. is formed on coupled layer 106, followed by a pair of ferromagnetic free layers 110 and 112, which may contain CoFe and NiFe, respectively.

Figure 3D:
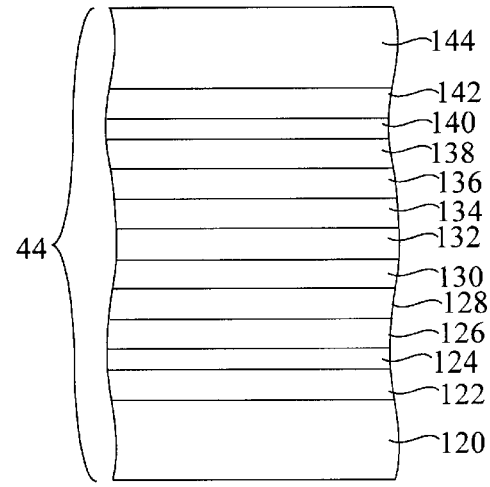
FIG. 3D is a cutaway cross-sectional view of plural layers forming a dual synthetic spin-valve sensor for the head of FIG. 1.

FIG. 3D illustrates an embodiment in which the MR sensor 44 is a dual synthetic spin valve (DSSV) sensor. In this case, an antiferromagnetic layer 120, which may be made of PtMn for example, is first formed. First and second ferromagnetic layers 122 and 126, which may contain CoFe, are magnetically coupled about noble metal layer 124, which may contain Ru. Antiferromagnetic layer 120 pins the coupled layers 122 and 126. A conductive spacer layer 128, which may contain Cu, is formed on coupled layer 126, followed by a ferromagnetic free layers 130, 132 and 134, which may contain CoFe, NiFe and CoFe, respectively. A thin conductive spacer layer 136 is then formed, for example of Cu. A first coupled ferromagnetic layer 138 is then formed, followed by a thin (preferably less than 10 Å-thick) layer 140 of Ru; and then a second coupled ferromagnetic layer 142 having a thickness substantially matching that of first coupled layer 138, such that the ferromagnetic layers 138 and 142 are magnetostatically coupled about the noble metal layer 140. An antiferromagnetic layer 144, which may be made of PtMn for example, is formed on and pins ferromagnetic layer 142, also pinning coupled layer 138.

The synthetic spin valve sensors depicted in FIG. 3B, FIG. 3C and FIG. 3D have the advantage of providing a more stable pinning structure than that illustrated in FIG. 3A. It has been discovered, however, that these synthetic spin valve embodiments suffer from corrosion, particularly during a test procedure known as "hot-wet" testing. A hot-wet test that heads or disk drives may have to pass to be considered reliable may include running for 100–200 hours in an environment of 80% humidity at a temperature of 90° C. When heads having MR sensors such as those represented by FIG. 3B, FIG. 3C and FIG. 3D were exposed to a hot-wet test, a loss of amplitude and increase in resistance were discovered that were traced to corrosion and/or depletion of the copper layers in the sensors, resulting in failure of a substantial fraction of those heads. Providing dual carbon-based overcoats in accordance with the present invention has solved this problem.

Figure 4:
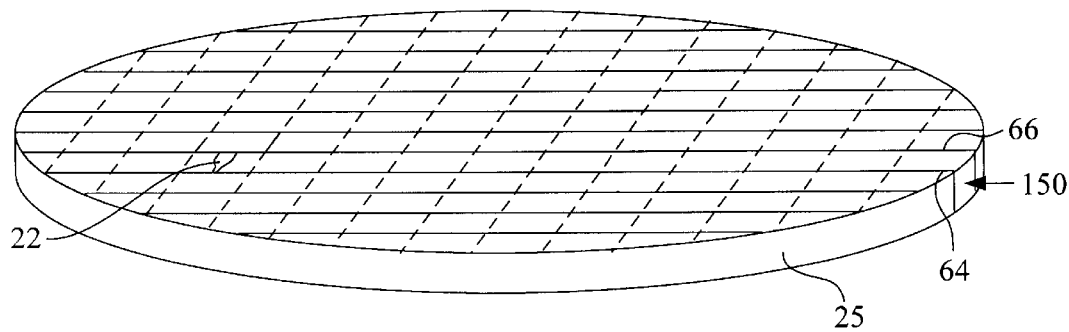
FIG. 4 is a perspective view of a wafer substrate with multiple transducers formed thereon being diced into rows for processing in accordance with the present invention.

FIG. 4 shows the wafer substrate 25 with a multitude of transducers formed thereon, including transducer 22. After formation of the multiple layers described above with regard to FIGS. 1–3, the substrate 25 and thin film layers are then cut along a number of lines such as lines 64 and 66, forming a row 150 along with perhaps one hundred other rows of heads from a single wafer 25.

Figure 5:
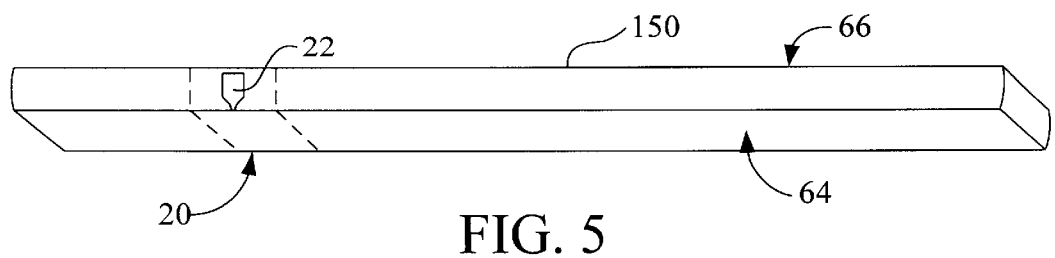
FIG. 5 is a perspective view of one of the transducer-bearing rows of FIG. 4.

FIG. 5 shows row 150 after separation from the other rows, with the recently formed transducer 22 visible through the transparent protective coating. Row 150 may be held in a chuck for processing of surface 64, which will become the media-facing surface of the heads in row 150. Surface 64 may be lapped while resistive leads are monitored to obtain a desired height of transducers including transducer 22. After lapping, surface 64 is coated with a first carbon-containing overcoat, which protects the transducers from damage during processing of surface 64. A carbon-containing overcoat is defined in the present disclosure to have an atomic concentration of carbon that is about one-fourth or more. Surface 64 is then masked and etched to create relieved features for a media-facing surface. Reactive ion etching (RIE) or ion beam etching (IBE) is used to create the relieved features of the media-facing surface. After these features are created, a second carbon-containing overcoat is formed, and the row 150 is separated into individual heads.

Figure 6:
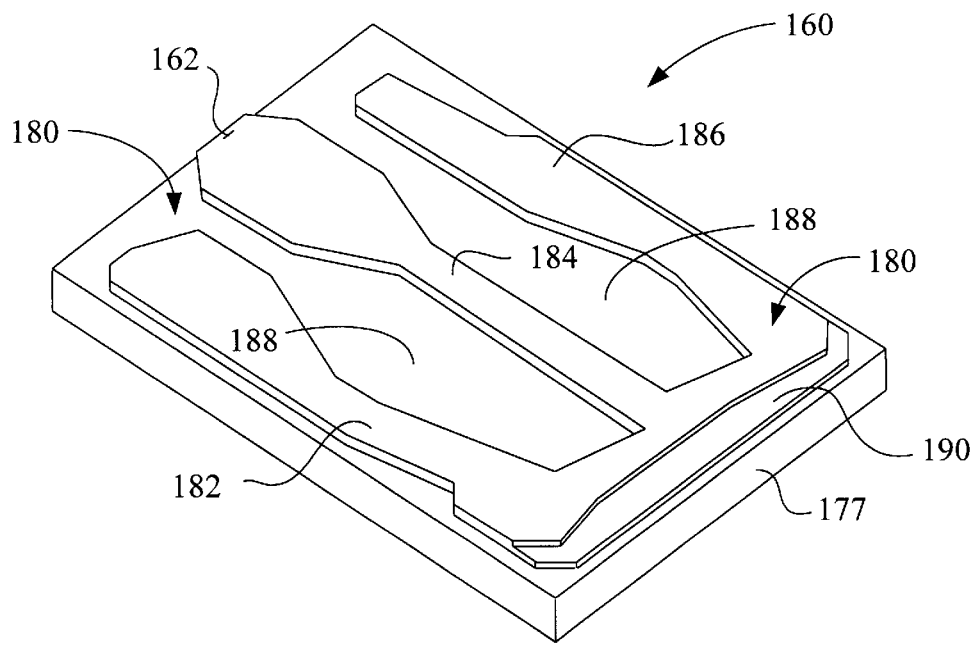
FIG. 6 is a perspective view of a head showing a media-facing surface formed in accordance with the present invention.

FIG. 6 shows such a head 160 with a transducer 162 and a media-facing surface 180 after creation of relieved features and plural carbon-containing overcoats. The head in this example has three rails 182, 184 and 186 that project slightly compared to a recessed area-188 of the media-facing surface 180. The media-facing surface 180 also has a shelf 190 that is intermediate in height between the recessed area and rails. The rails may project a few microns or less beyond the recessed areas. The rails, recessed areas and shelf are designed to position the head 160 at a small but substantially constant distance that may be between about one microinch and one-half microinch from the surface of a rapidly spinning rigid disk.

Figure 7A:
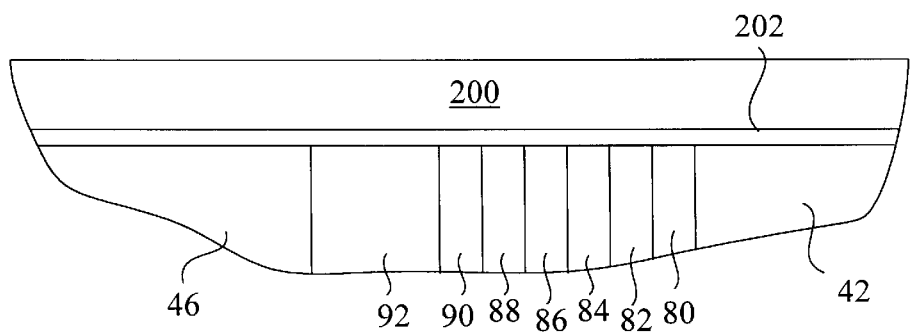
FIG. 7A is a cutaway cross-sectional view of some steps in the production of an embodiment of a head in accordance with the present invention, showing a transducer of FIG. 3B covered with an adhesion layer and a first carbon-containing overcoat.

FIG. 7A shows the formation of a first carbon-containing overcoat 200 on a media-facing surface of the MR sensor of FIG. 3B. A silicon-containing adhesion layer 202, which may for example be made of Si, SiC or $Si_3N_4$, is first deposited to a thickness of, for example 10 Å to 20 Å. The first carbon-containing overcoat 200 in this embodiment is formed of DLC and may have a thickness in a range-between about 15 Å and 100 Å.

Figure 7B:
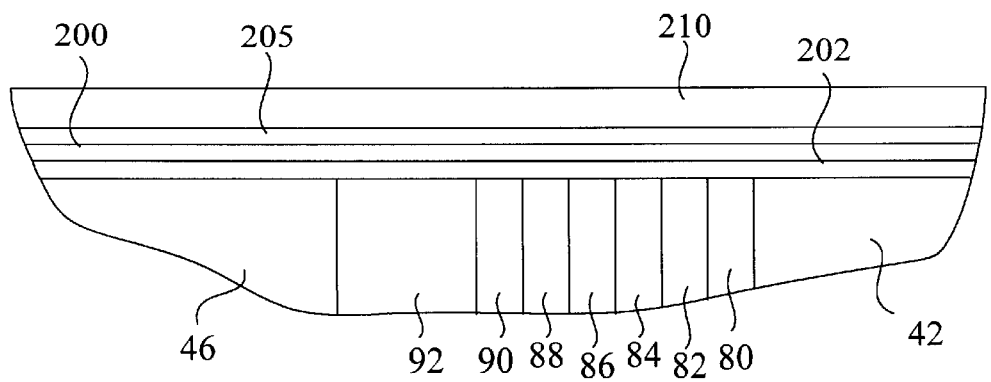
FIG. 7B is a cutaway cross-sectional view of some later steps in the production of the head of FIG. 7A, including first and second carbon-containing overcoats.

As shown in FIG. 7B, after formation of the rails, recessed areas and shelf, the first carbon-containing overcoat 200 is at least partially removed, and a second silicon-containing adhesion layer 205 is deposited, followed by a second carbon-containing overcoat 210. Removal or thinning of the first carbon-containing overcoat may be accomplished for example by sputtering an ion beam on the overcoat. The beam may contain argon (Ar) ions which are directed at a small angle (e.g., $\leq 45°$) from normal to the media-facing surface, with the beam rotating about the normal. The silicon-containing adhesion layer 205 may be formed to a thickness of 10 Å to 20 Å and may, for example, be made of Si, SiC or $Si_3N_4$. The second carbon-containing overcoat 210 in this embodiment may be formed of DLC and has a thickness in a range between about 15 Å and 70 Å. The first or second carbon-containing overcoats 200 and 210 may contain m-DLC, e-DLC, a-DLC or t-aC, where the prefixes "m" "e" and "a" indicate diamond like carbon coatings made from ion beam chemical vapor deposition (IBCVD) using precursors of methane, ethylene, and acetylene, respectively. These precursors have different concentrations of hydrogen that result in differing characteristics of DLC films. Tetrahedral-amorphous carbon (ta-C) can be formed by filtered cathodic arc deposition to have primarily $sp^3$ bonds, to be essentially free of defects and to have a hydrogen concentration that can be zero or greater. The first or second carbon-containing overcoats 200 and 210 may instead be formed of dense, nonporous, essentially defect-free SiC, as disclosed in U.S. patent application Ser. No. 09/352,544 to Han et al., incorporated by reference herein.

Figure 7C:
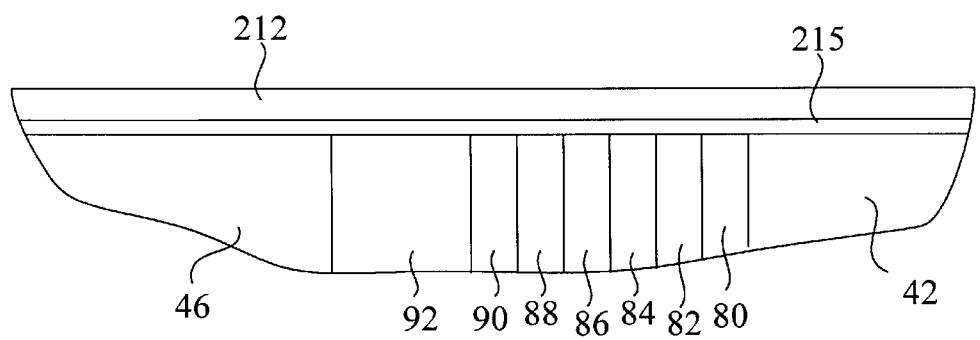
FIG. 7C is a cutaway cross-sectional view of some later steps in the production of the head of FIG. 7A, in which the first carbon-containing overcoat has been removed and a second carbon-containing overcoat has been formed.

Alternatively, as shown in FIG. 7C, the first carbon-containing overcoat and first silicon-containing adhesion layer may be completely removed prior to formation of a second carbon-containing overcoat 212 and second silicon-containing adhesion layer 215. In this example, the second carbon-containing overcoat 212 has a thickness of 45 Å, and the second silicon-containing adhesion layer 215 has a thickness of 15 Å. Instead of removing all of the first adhesion layer, the first carbon-containing overcoat may be completely removed, while some or all of the first adhesion layer may remain for providing adhesion for the second carbon-containing overcoat 212. The silicon layer may optionally provide an etch-stop for RIE removal, such as oxygen ashing, or a signal for IBE removal that stops the removal.

Figure 8A:
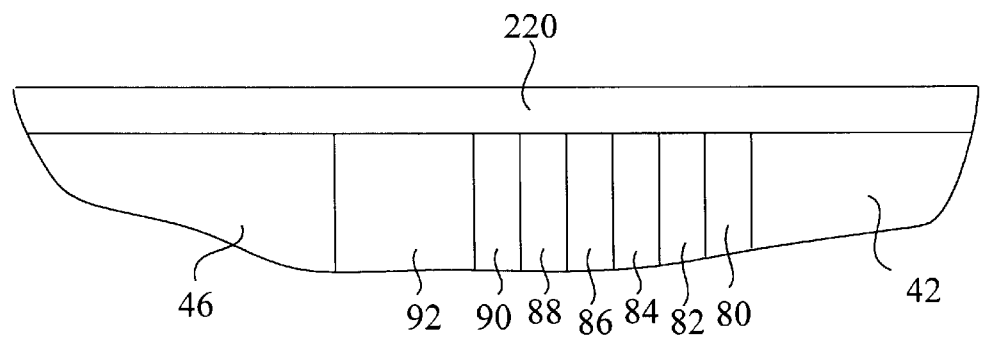
FIG. 8A is a cutaway cross-sectional view of some steps in the production of an embodiment of a head in accordance with the present invention, showing a transducer of FIG. 3B covered with a first carbon-containing overcoat without an adhesion layer.

In FIG. 8A, a first carbon-containing overcoat 220 has been formed on a media-facing surface of the MR sensor of FIG. 3B. The first carbon-containing overcoat 220 may contain dense, nonporous SiC, e-DLC, a-DLC or t-aC, and may be formed to a thickness in a range between about 10 Å and 100 Å. In this embodiment a silicon-containing adhesion layer does not necessarily have to be formed to ensure adhesion of the first carbon-containing overcoat 220 to the media-facing surface of the MR sensor. This interlayer-free layer of DLC may be formed with carbon ions that nucleate ceramic layers as well as magnetic layers.

Figure 8B:
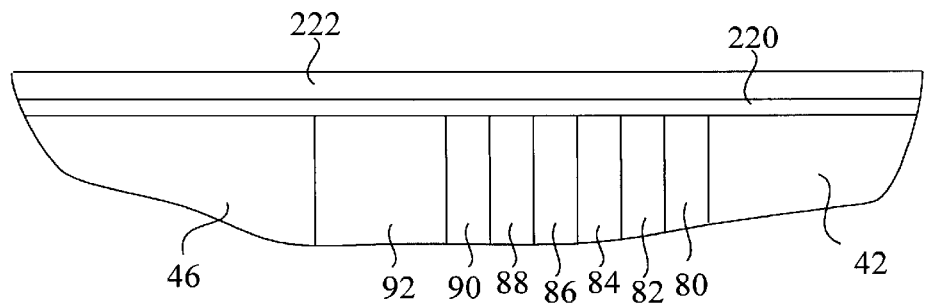
FIG. 8B is a cutaway cross-sectional view of some later steps in the production of the head of FIG. 8A, including first and second carbon-containing overcoats.

As shown in FIG. 8B, after formation of the rails, recessed areas and shelf, the first carbon-containing overcoat 220 may be partially removed, and a second carbon-containing overcoat 222 is formed. For the case in which the first carbon-containing overcoat 220 was formed to be relatively thin, for example having a thickness in a range between about 10 Å and 20 Å, the first carbon-containing overcoat need not be partially removed prior to formation of the second carbon-containing overcoat 222. The second carbon-containing overcoat 222 may contain dense, nonporous SiC, e-DLC, a-DLC, t-aC or other forms of DLC.

In addition to reducing corrosion, the formation of a laminated overcoat made of two or more carbon-containing layers may provide lower overall stress than an overcoat made of a single carbon-containing layer of the same thickness as the laminated overcoat, which may improve adhesion. Also, it may be advantageous to form a laminated overcoat from different types of carbon-containing layers, for example with a first layer of e-DLC and a second layer of a-DLC. Forming the first carbon-containing layer of dense, nonporous SiC and the second carbon-containing layer of m-DLC, eDLC, a-DLC or t-aC may be advantageous, in that the first layer also contains silicon, and can provide adhesion for the second carbon-containing layer. Alternatively, the dense, nonporous SiC can be employed for the second carbon-containing layer, with the first carbon-containing layer formed of m-DLC, e-DLC, a-DLC, t-aC or SiC, which may improve an interface with a disk coating.

Figure 8C:
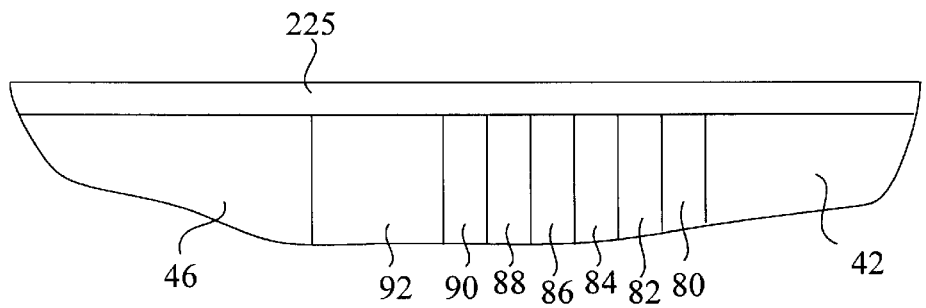
FIG. 8C is a cutaway cross-sectional view of some later steps in the production of the head of FIG. 8A, including a second carbon-containing overcoat, with first carbon-containing overcoat removed.

FIG. 8C shows an embodiment in which a first carbon-containing layer formed prior to creation of relieved features on a media-facing surface has been removed, and a second carbon-containing layer 225 has been formed after creation of the relieved features. Any optional silicon-containing adhesion layer that may have been formed has also been removed. The second carbon-containing layer 225 may be formed of dense, nonporous SiC, e-DLC, a-DLC or t-aC to a thickness in a range between about 15 Å and 80 Å. The dense, nonporous SiC in this case may be formed by sputtering SiC at a media-facing surface during bombardment of that surface with neutral atoms.

Figure 9:
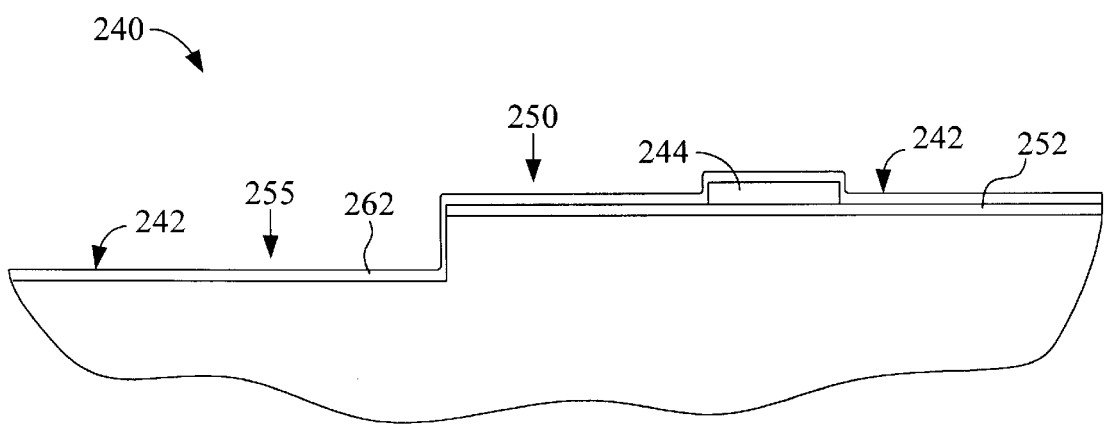
FIG. 9 is a cross-sectional view of a portion of a head including a microscopic pad on a media-facing surface.
Figure 10:
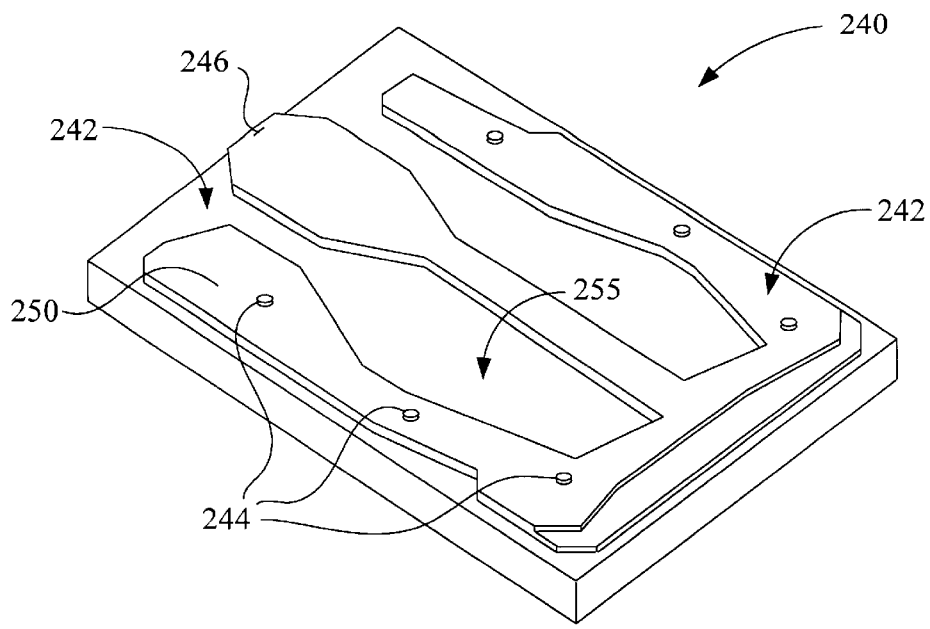
FIG. 10 is a perspective view of the head of FIG. 9 showing a plurality of pads on the media-facing surface.

FIG. 9 is a cross-sectional view of a portion of a head 240 having a media-facing surface 242 that is shown in a perspective view in FIG. 10. The media-facing surface 242 has at least one pad 244 located distal to a transducer 246 on an air bearing rail 250, like that disclosed in U.S. patent application Ser. No. 09/239,594 to Han et al., incorporated by reference herein. Pad 244 may be formed of SiC, m-DLC, e-DLC, a-DLC or t-aC that is deposited through a mask disposed atop a first carbon-containing overcoat 252 that was formed on the media-facing surface 242 prior to relieving the surface via etching or the like. A recessed area 255 is then formed by RIE or IBE, leaving rail 250 projecting above the recessed area, in which first carbon-containing overcoat 252 has been removed. A second carbon-containing overcoat 262 is then formed on the media-facing surface 242. Thus plural carbon-containing coatings surround the pads 244, ensuring that the pads do not break free from the media facing is surface 242.

Figure 11:
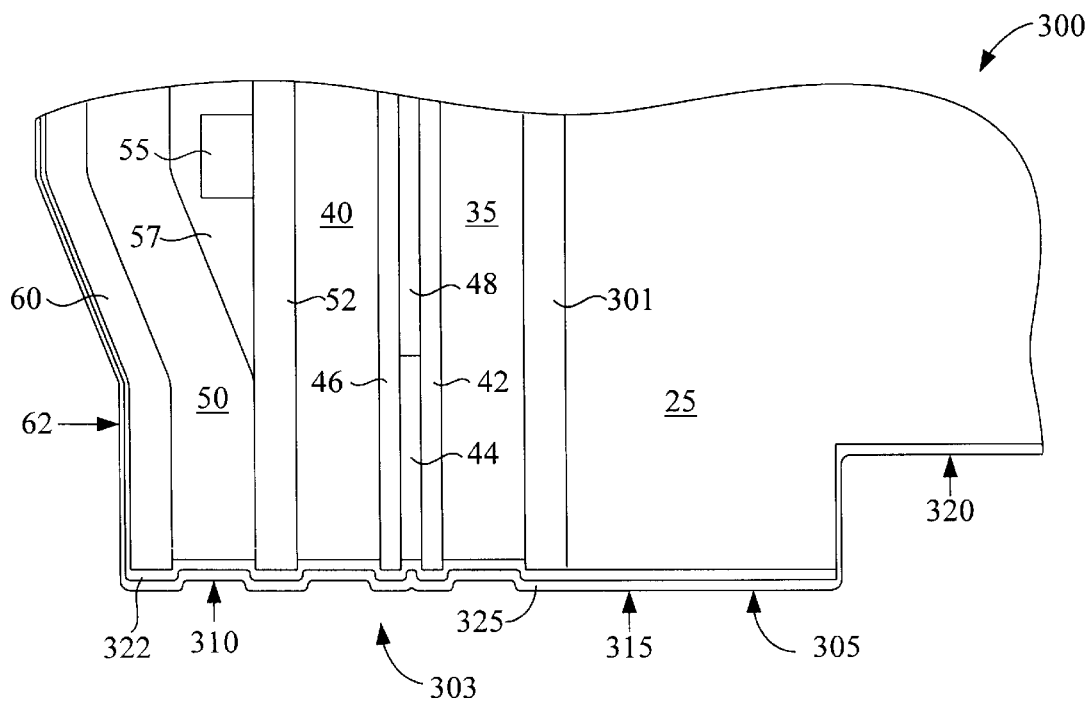
FIG. 11 is a cross-sectional view of a portion of a head having a media-facing surface that is slightly recessed adjacent a MR sensor.

FIG. 11 is a cross-sectional view of a portion of a head 300 having a merged transducer 303 similar to that shown in FIG. 1, with like elements sharing the same numbers in the two figures. An amagnetic, electrically insulating layer 301, which for conciseness was omitted from the description of FIG. 1, is disposed between the substrate 25 and the first shield layer 35. A media-facing surface 305 of head 300 has a slightly recessed area 310 adjacent metallic elements such as the MR sensor 44 and magnetically permeable yokes 40 and 50, compared with a slightly projecting area 315 disposed adjacent the substrate and ceramic layers. A much more recessed area 320 of the media-facing surface 305 is disposed distal to the transducer 303, the recessed area 320 being similar to recessed area 255 shown in FIG. 10. Thin film layers including the MR sensor 44 may be recessed relative to the substrate 25 in order to avoid wear and thermal asperities that may otherwise occur due to contact with a media surface, not shown. Formation of the head 300 of FIG. 11 proceeds similarly to that described above, however, the thin film layers including the MR sensor 44 may be initially recessed by chemical, mechanical and/or ion beam processes that preferentially remove those layers relative to the substrate 25. A first carbon-containing coating 322 is then formed prior to shaping the media-facing surface 305 with features such as recessed area 320. A second carbon-containing coating 325 may be formed after the formation of recessed areas such as area 320.

In accordance with the present invention, we have disclosed forming plural carbon-containing overcoats on a media-facing surface of a head, which may have benefits including corrosion avoidance. Although we have focused on teaching the preferred embodiment, other embodiments and modifications of this invention will be apparent to persons of ordinary skill in the art in view of these teachings. Therefore, this invention is to be limited only by the following claims, which include all such embodiments and modifications when viewed in conjunction with the above specification and accompanying drawings.

What is claimed is:

1. A head for an information storage system, the head comprising:
    a solid body including a plurality of adjoining solid layers structured as a microscopic electromagnetic transducer, said solid body having a major surface including a projection and a recess, said projection disposed adjacent to said transducer, with a submicron overcoat disposed on said major surface, said overcoat having a thickness which is greater on said projection than on said recess, wherein said greater thickness of said overcoat covers said transducer.

2. The head of claim 1, wherein said overcoat contains a plurality of carbon-containing layers.

3. The head of claim 1, wherein said overcoat contains a plurality of carbon-containing layers, with a greater number of said carbon-containing layers being disposed on said projection than on said recess.

4. The head of claim 1, wherein said overcoat has an atomic concentration of carbon atoms that is at least about fifty-percent.

5. The head of claim 1, wherein said overcoat includes material from a group containing m-DLC, e-DLC, a-DLC, t-aC and SiC.

6. The head of claim 1, wherein said transducer includes a spin valve sensor.

7. The head of claim 1, wherein said transducer contains ruthenium, iridium or rhodium.

8. A head for an information storage system, the head comprising:
    a solid body having a major surface and including a plurality of adjoining solid layers, said layers including a plurality of electromagnetic transducer layers,
    a first carbon-containing layer disposed on said major surface, and
    a second carbon-containing layer disposed on said first carbon-containing layer,
    wherein said major surface has a projection and a recess, with said second carbon-containing layer being disposed on said projection and on said recess, and said first carbon-containing layer being disposed on said projection, adjoining at least one of said transducer layers and not being disposed on said recess.

9. The head of claim 8, further comprising a silicon-containing layer adjoining said first carbon-containing layer.

10. The head of claim 8, wherein at least one of said carbon-containing layers contains silicon.

11. The head of claim 8, wherein said transducer layers form a spin valve sensor.

12. The head of claim 8, wherein said transducer layers contain ruthenium, iridium or rhodium.

13. The head of claim 8, wherein at least one of said carbon-containing layers includes material from a group consisting essentially of m-DLC, e-DLC, a-DLC, t-aC and SiC.

14. A head for an information storage system, the head comprising:
- a solid body having a major surface including a projection and a recess,
- with a plurality of adjoining solid layers forming a microscopic electromagnetic transducer contained in said body, and
- a carbon-containing overcoat disposed on said major surface, said overcoat including at least two carbon-containing layers covering said transducer and only one of said carbon-containing layers in an area of said major surface not covering said transducer.

15. The head of claim 14, wherein said transducer includes a magnetoresistive sensor.

16. A head for an information storage system, the head comprising:
- a solid body having a leading end, a trailing end and a media-facing surface, said media-facing surface having a first portion and a second portion,
- said body including an electromagnetic transducer disposed adjacent to said trailing end and adjacent to said first portion of said media-facing surface,
- a first carbon-containing layer that is disposed on said transducer in said first portion of said media-facing surface, said first carbon-containing layer not being disposed on said second portion of said media-facing surface, and
- a second carbon-containing layer that is disposed on said first carbon-containing layer and that is disposed on said second portion of said media-facing surface.

17. The head of claim 16, further comprising a silicon-containing layer adjoining said first carbon-containing layer.

18. The head of claim 16, wherein said transducer includes a magnetoresistive sensor.

19. The head of claim 16, wherein said transducer contains ruthenium, iridium or rhodium.

20. The head of claim 16, wherein at least one of said carbon-containing layers includes material from a group consisting essentially of m-DLC, e-DLC, a-DLC, t-aC and SiC.

* * * * *